United States Patent [19]

Owen et al.

[11] E Re. 29,702

[45] Reissued Jul. 18, 1978

[54] SPIRAL WOUND GASKET ASSEMBLY METHOD

[75] Inventors: A. B. Owen; Bruce M. Gifford, both of Harris County, Tex.

[73] Assignee: Lamons Metal Gasket Company, Houston, Tex.

[21] Appl. No.: 807,314

[22] Filed: Jun. 16, 1977

Related U.S. Patent Documents

Reissue of:

[64] Patent No.: 4,019,244
Issued: Apr. 26, 1977
Appl. No.: 658,509
Filed: Feb. 17, 1976

[51] Int. Cl.[2] ..... B21D 39/00; B23P 11/00

[52] U.S. Cl. ..... 29/520; 277/203; 277/235 R

[58] Field of Search ..... 29/509, 516, 520; 277/235 R, 203, 204

[56] References Cited

U.S. PATENT DOCUMENTS

| | | | |
|---|---|---|---|
| 2,357,257 | 8/1944 | Goetze | 277/204 |
| 2,466,263 | 4/1949 | Nardin | 277/204 |
| 2,828,987 | 4/1958 | Schmitz | 277/204 X |
| 2,854,074 | 9/1958 | Frank et al. | 29/520 UX |
| 2,937,434 | 5/1960 | Swift | 29/520 UX |
| 3,815,927 | 6/1974 | Geipel | 277/204 X |

FOREIGN PATENT DOCUMENTS

| | | | |
|---|---|---|---|
| 1,213,243 | 11/1970 | United Kingdom | 227/204 |

*Primary Examiner*—Charlie T. Moon
*Attorney, Agent, or Firm*—Pravel, Wilson & Gambrell

[57] ABSTRACT

Spiral wound gasket assembly and method of making same, wherein a spiral wound gasket ring is positioned in an inner groove in a metal gauge ring and a deformation is formed in the gauge ring adjacent the groove to reduce the size of the gauge ring groove to retain the gasket ring within the groove.

9 Claims, 5 Drawing Figures

SPIRAL WOUND GASKET ASSEMBLY METHOD

Matter enclosed in heavy brackets [ ] appears in the original patent but forms no part of this reissue specification; matter printed in italics indicates the additions made by reissue.

BACKGROUND OF THE INVENTION

This invention relates generally to the field of spiral wound gasket assemblies.

As far as known, the prior art method of manufacturing spiral wound gasket assemblies has consisted of forming a spiral wound gasket ring having several outer, loose strips of metal and then manually positioning the gasket ring within an inner groove in a circular gauge ring by hammering on the gasket ring with a suitable hammer. With this prior art method, the circular gasket ring is formed on a mandrel from alternating layers of metal strip and insulating material strip and welds are formed in inner and outer portions of the metal strip to retain the layers in a ring. The insulating material is commonly asbestos but may be other materials. Usually three to four loose wraps of metal strip are provided on the outer periphery so that the outer diameter of the gasket ring can be varied some by cutting off some of the excess wraps of metal strip so that the gasket ring can be positioned into the inside diameter of the gauge ring. The loose wraps act as a spiral spring to retain the gasket ring in the groove. In practice, the loose wraps are tightly wound about the outer perimeter of the gasket ring by a worker and a gasket is positioned adjacent the groove. The operator may then tap the gasket ring into the groove with the loose wraps springing outwardly against the groove to retain the gasket ring within the ring. Also, because the insulating material such as asbestos absorbs humidity, and also because of variations caused during manufacturing, the outside diameters of the gasket rings may vary so each fit between a gasket ring must be individually in a gauge ring by the person making the assembly.

Such prior procedure requires skill on the part of the worker and is a tedious, time consuming operation that requires much hand labor. Since it is generally necessary to trim a portion of the excess metal strip to fit the gasket ring inside of the gauge ring, such metal is wasted and becomes scrap. The prior art procedure produces gaskets which generally vary in the tightness of fit between the gauge ring and the groove. While a tight fit is desired, such a tight fit is more difficult and takes more time to achieve with the prior art procedure.

Radially deforming of the prior art gasket occurs when the gasket ring is placed under its intended compression load. This is necessarily so since the diameter of the gasket ring including the loose wraps of metal strip must be less than the inner diameter of the gauge ring to permit inserting the gasket ring within the gauge ring groove resulting in some radial play between the gasket ring and gauge ring groove. Accordingly, the initial loading of prior art gaskets provided non-sealing radial expansion until the play was taken up whereby further loading resulted in axial compression of the gasket ring to provide sealing.

SUMMARY OF THE INVENTION

This invention relates to a new and improved apparatus and method for forming a spiral wound gasket assembly from a preformed gasket ring which is inserted into and retained by a gauge ring. In the preferred embodiment, the gasket ring is formed from alternating layers of metal strip and gasket material and one or more welds are provided in the inner and outer end portions of the metal strip to retain the gasket material compressed between the layers of metal strip. The gasket ring is formed with an outside diameter which is less than the inside diameter of the gauge ring into which it is to be inserted. The gasket is then positioned in the central opening of the gauge ring. Thereafter, the gasket assembly is formed by deforming the gauge ring to retain the gasket ring inside of the gauge ring.

DESCRIPTION OF THE PREFERRED EMBODIMENT

Figure 1:
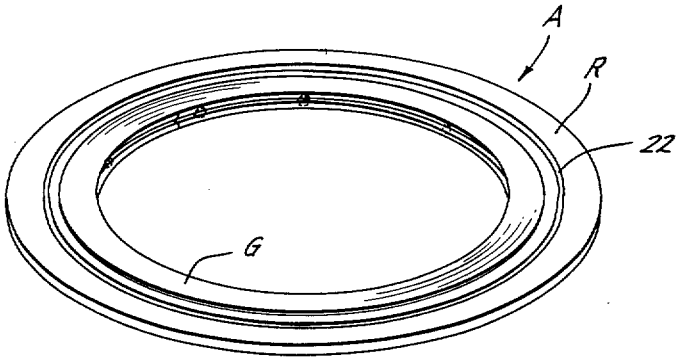
FIG. 1 illustrates a finished gasket.

In the drawings, the letter A designates generally the new and improved spiral wound gasket assembly of this invention (FIG. 1) which is formed by the new and improved method and apparatus described hereinafter, wherein the gasket ring G is inserted in a groove 10 in a metal gauge ring R and a circumferential deformation or circumferential indentation is formed in the metal gauge ring to retain the gasket ring in the groove.

Figure 2:
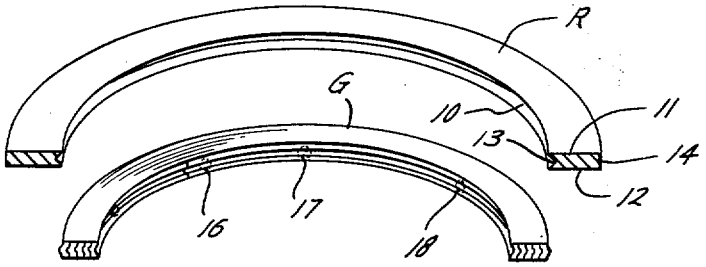
FIG. 2 illustrates an exploded section of a gasket assembly.

As shown in FIG. 2, in exploded section, the gasket ring R includes a solid metal gauge ring having an inner circumferential groove 10. The groove receives the gasket ring G which has a plurality of alternating layers of metal stripping and gasket material formed into a spiral wound gasket ring. The gasket assembly is shown in greatly enlarged cross section in FIG. 3 positioned in the dies of the deforming apparatus for deforming the metal gauge ring as will be hereinafter described. The metal gauge ring includes, as shown in the drawing, a top gauge surface 11 and a bottom gauge surface 12. The gauge ring includes an inner V-shaped groove 13 and an outer peripheral edge surface 14.

Figure 3:
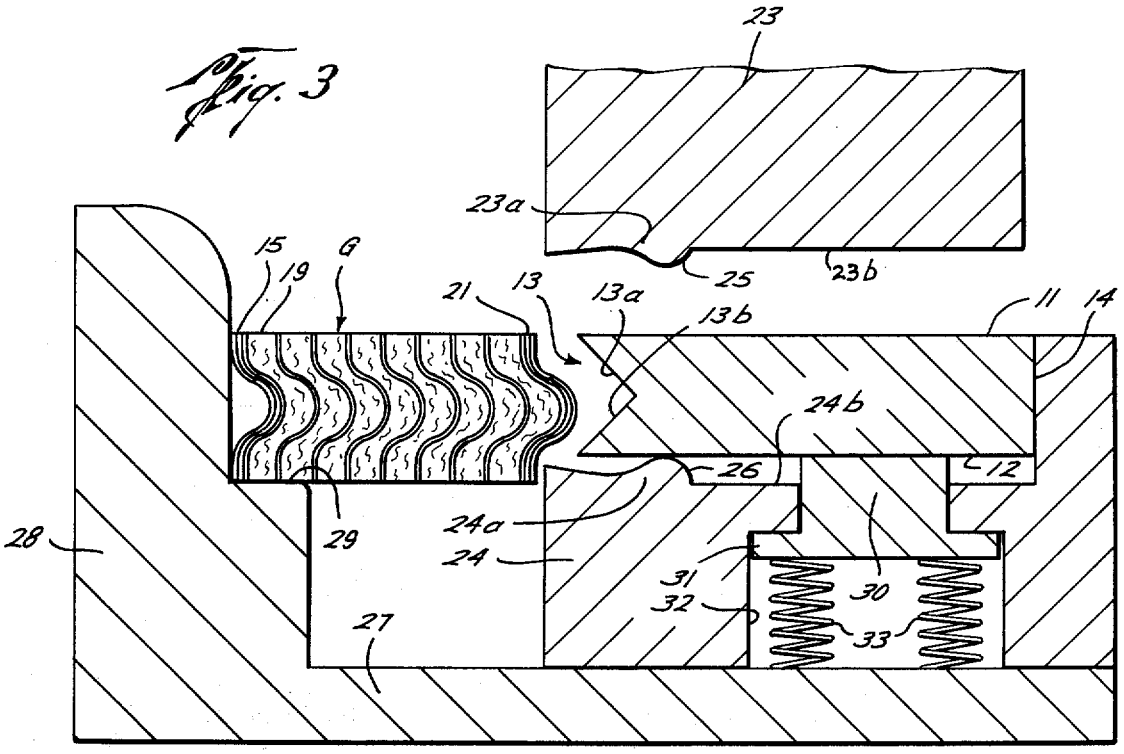
FIG. 3 illustrates an enlarged deforming appparatus with an enlarged gasket assembly.

The gasket ring G is formed in any suitable known manner such as by first winding a plurality of inner wraps of metal strip 15 having a cross section as shown in FIG. 3. A plurality of spot welds are provided to retain the metal strip in its circular shape. After initially providing three to four wraps of metal strip, a strip of gasket material which may be asbestos, teflon or the like is inserted in the forming mandrel so that subsequent rotation of the gasket ring in its forming mandrel will provide alternating layers of metal strip and gasket material until a gasket ring is formed having a desired size. The gasket material is severed at 20 and a plurality of wraps of outer metal strip 21 are provided. A plurality of welds are made at spaced intervals along the outer portion of the metal strip 21 to retain the gasket in its spiral shape. As discussed above, in the past several additional loose wraps of metal strip beyond the welds were generally provided to enable the gasket ring to be fitted into the gauge ring with the loose wraps springing outwardly into the gauge ring groove to retain the gasket ring within the groove. Applicant's invention could be utilized to provide a tight fit between the prior art gasket ring having several loose wraps and its gauge ring groove. However, Applicant's invention eliminates the need of having these loose wraps which perform no sealing function.

The next step in forming the completed gasket assembly includes inserting the gasket ring G in the groove 13 of the metal gauge ring. In order to allow insertion of the gasket ring in the groove 13 without cutting off any of the metal strip 21, the outer diameter of the gasket ring is slightly smaller than the inside diameter of the groove 13 so that the ring may be easily positioned within the groove 13. The difference between the outer diameter of the gasket ring and the inside diameter of the groove 13 are exaggerated in FIG. 3 to clearly illustrate the invention. In actual practice, the amount of annular space between the gasket ring and the groove before deformation of the gauge ring is usually less than indicated in the drawings. It is understood that the size of the gasket ring is such that it can be readily inserted within the groove with little and preferably no hammering of the gasket G into the ring R is required. By making the gasket ring G with a smaller outside diameter than the inside diameter of the gauge ring R, such advantages are assured.

Figure 4:
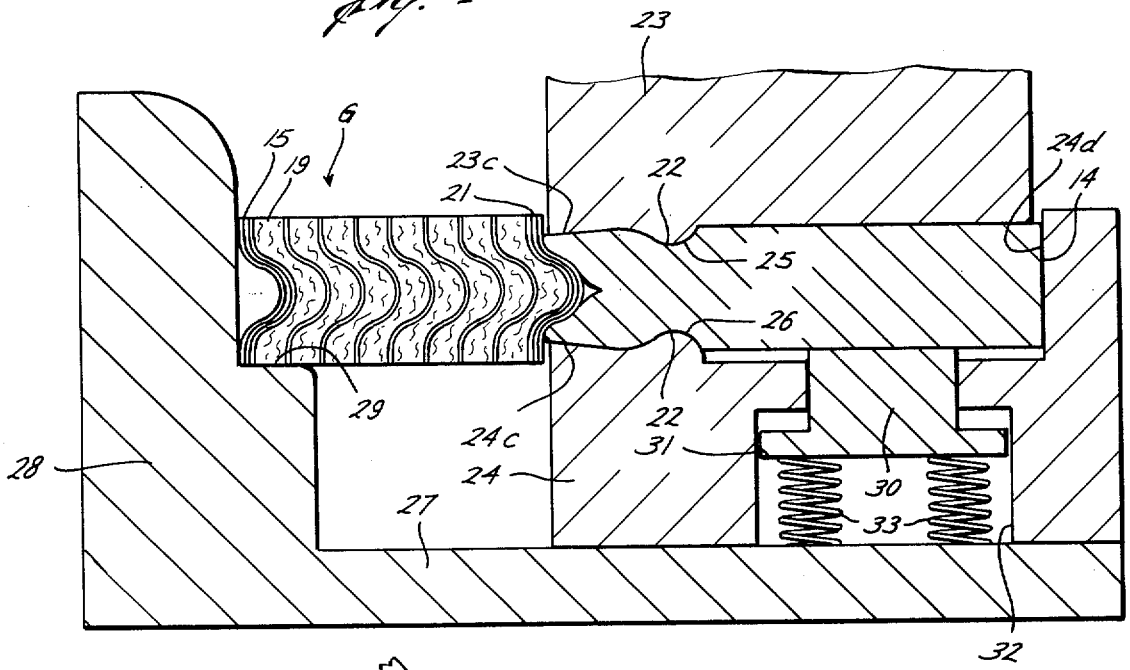
FIG. 4 illustrates the completed enlarged gasket assembly in the enlarged deforming apparatus.
Figure 5:
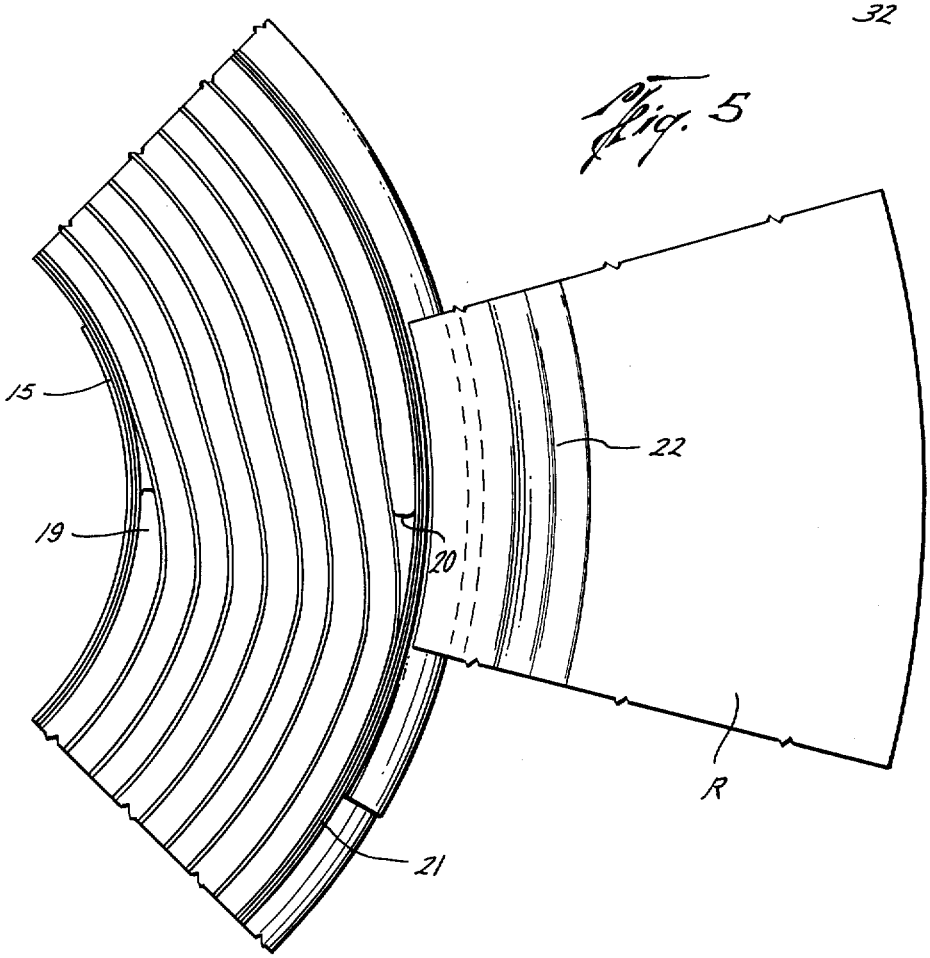
FIG. 5 illustrates an enlarged plan view of a portion of the completed gasket assembly.

The completed gasket is shown in FIG. 5 of the drawings. The metal gauge ring R is shown in FIG. 4 with deformations or circumferential indentations 22 which are formed in the upper gauge surface as well as the bottom gauge surface, to reduce the inner diameter and size of the groove 13 so as to retain the outer portion of the gasket 21 within the groove.

A method and apparatus for forming the deformation 22 in the gauge ring R is illustrated in FIGS. 3 and 4. The apparatus includes an upper die 23 and a lower die 24. The upper and lower dies include metal working portions 23a and 24a, respectively, which form the deformations or circumferential indentations in the gauge ring R to tighten the gasket ring G in the groove 13. The upper and lower dies 23 and 24 include groove forming portions 25 and 26, respectively, which form the deformations 22 in the gauge ring.

The apparatus for forming the deformation in the gauge ring further preferably includes a base portion 27 with an upstanding support 28 having a stepped portion 29 for supporting the gasket ring G. The lower die 24 is mounted on the base portion and includes a spring biased member 30 having an enlarged base portion 31 which is reciprocally mounted in an aperture 32 in the die. A plurality of springs act between the base portion 27 and the enlarged base portion 31 to bias the member 30 upwardly as shown in FIG. 3. The member 30 extends above the upper surface 24b of the lower die a distance equals to the distance that the groove forming portion 26 extends above the surface 24b. Accordingly, when the metal gauge ring and gasket ring are inserted in the die of the apparatus, the metal gauge ring will remain level relative to the gasket ring G. The resiliency of the springs is sufficient to maintain the member 30 extending from the surface 24b enough to maintain the gauge ring level and aligned with the gasket ring during the deforming operation.

The upper die 23 is reciprocally mounted relative to the base portion 27 so that it may be moved downwardly into engagement with the metal gauge ring as shown in FIG. 4. When sufficient pressure is applied to the upper die, deformations in the metal of the gauge ring adjacent the groove 13 will occur which will result in a reduction of the inner diameter of the groove 13. Also, the thickness of the metal around the groove 13 will also be reduced resulting in a slight reduction in the size of the groove as also shown in FIG. 4. This reduction in the inside diameter of the metal gauge ring R and the size of the groove 13 retains the gasket ring G in the groove. The tightness of the gasket ring in the gauge ring groove 13 is determined by the amount of deformation of the gauge ring. This deformation may be limited or controlled so that the gasket ring has a tight non-sliding fit or has a sliding fit inside the groove due to a slight amount of clearance between the outer periphery of the gasket ring and the groove. It is believed that the non-sliding fit is preferable and provides a better gasket since a tight fit restricts deforming of the gasket ring under load. In other words, the tight fit limits the radial deformation of the gasket ring, resulting in a stiffer system capable of carrying higher stud loads. A greater percentage of the deformation of the gasket is elastic rather than radial deformation. The upper surface 24b of the die 24 is shown spaced from the gauge ring in FIG. 4. This spacing makes it possible to provide a varying amount of deformation or indention in the gauge ring so as to vary the tightness of the gasket ring in the groove depending on the amount of force applied to the upper die 23. A similar spacing could also be provided between the opposing surface of the upper die and the upper gauge surface 11. The upper and lower dies include outer metal forming portions 23c and 24c, respectively, which act to reduce the size of the V-shaped groove 13 by deforming the sides 13a and 13b of the groove inwardly against the outer peripheral surface of the metal stripping 21. The deformation 22 formed in the metal gauge ring do not affect the proper functioning of the metal gauge ring since the deformations are adjacent the groove and the undeformed portions of the surfaces 11 and 12 are sufficiently wide to provide the gauging function when the gasket assembly is utilized. Surface 24d on the lower die engages the outer peripheral surface 14 of the gauge ring to retain the gauge ring position during the metal deforming operation. This surface 24d prevents any change in the outside diameter of the metal gauge ring during the metal deforming operation. For illustrative purposes, the beginning portion 19 and the end portion 20 of the gasket material as well as the ends of the metal strip 21 are shown in line within a small segment of the enlarged ring in FIG. 5. In actual practice, the beginnings and ends of the gasket material as well as of the metal strip are generally staggered about the entire ring.

Although the invention has been described as having the deformations 22 in both faces of the gauge ring R, the deformation of the groove 13 could be obtained by deformation on only one face. Similarly, only one half of the wall of the groove 13 could be deformed for retaining the gasket ring R in the groove 13, although normally, such partial one-sided deformations would not be fully satisfactory.

The foregoing disclosure and description of the invention are illustrative and explanatory thereof and various changes in the size, shape and materials as well as in the details of the illustrated construction may be made without departing from the spirit of the invention.

We claim:

1. A method of forming a spiral wound gasket assembly having a gasket ring and an [ouer] *outer* metal gauge ring with flat [guide] *gauge* surfaces between an inner groove and an outer peripheral edge, wherein the improvement comprising the steps of:

forming a spiral gasket ring with the exterior diameter of the ring allowing positioning of the ring in the gauge ring groove;

positioning the gasket ring within the gauge ring; and deforming a portion of the gauge ring to reduce the size of the gauge ring groove to tighten and retain the gasket ring within the groove.

2. The method as set forth in claim 1, wherein:

the step of deforming includes locating the gasket assembly in a deforming apparatus and forming circumferential deformations in each of the flat surfaces of the gauge ring adjacent the groove to reduce the size of the groove.

3. The method as set forth in claim 1, wherein:

the step of deforming includes deforming a side portion adjacent the groove to reduce the size of the groove.

4. The method as set forth in claim 1, wherein:

the step of deforming includes reducing the size of the gauge ring an amount sufficient to tightly retain the gasket ring in the groove providing a non-sliding fit and limiting radial deformation of the gasket ring under load.

5. The method as set forth in claim 1, wherein:

the step of deforming includes reducing the size of the gauge ring groove an amount sufficient to retain the gasket ring in the groove while still allowing a sliding fit between the gasket ring and gauge ring.

6. The method as set forth in claim 1, wherein:

the step of deforming includes forming circumferential indentions adjacent the groove in each of the flat surfaces to provide said tightening and retaining.

*7. The method as set forth in claim 1, wherein the inner groove is annular and is centrally located intermediate the flat gauge surfaces and is defined by spaced annular opposed side surfaces and wherein the step of deforming comprises:*

*deforming the spaced opposed side surfaces of the groove inwardly against the outer peripheral surface of the gasket ring defining the exterior diameter thereof to retain the gasket ring in the groove.*

*8. The method as set forth in claim 7, wherein the step of deforming the sides of the groove comprises:*

*reducing the inner diameter of the groove by forming a circumferential indentation in each of the gauge surfaces to retain the gasket ring within the groove of the gauge ring.*

*9. The method as set forth in claim 7, wherein the inner groove is generally V-shaped, with the point of the "V" pointing outwardly from the center of the gauge ring and wherein the step of forming the circumferential indentations comprises:*

*deforming the opposed side surfaces of the groove an amount sufficient to tightly retain the gasket ring in the groove for providing a non-sliding fit and limiting radial deformation of the gasket ring under load.*

* * * * *